United States Patent
Busbey et al.

(10) Patent No.: US 7,413,405 B2
(45) Date of Patent: Aug. 19, 2008

(54) BIPEDAL DAMPER TURBINE BLADE

(75) Inventors: Bruce Clark Busbey, Greer, SC (US); Matthew Mark Weaver, Loveland, OH (US); Gregory Terrence Garay, West Chester, OH (US)

(73) Assignee: General Electric Company, Schenectady, NY (US)

( * ) Notice: Subject to any disclaimer, the term of this patent is extended or adjusted under 35 U.S.C. 154(b) by 530 days.

(21) Appl. No.: 11/151,769

(22) Filed: Jun. 14, 2005

(65) Prior Publication Data

US 2006/0280606 A1    Dec. 14, 2006

(51) Int. Cl.
*F01D 5/26*    (2006.01)
(52) U.S. Cl. .................... 416/96 A; 416/500
(58) Field of Classification Search ................ 416/224, 416/500
See application file for complete search history.

(56) References Cited

U.S. PATENT DOCUMENTS

| | | | |
|---|---|---|---|
| 2,460,351 A | 2/1949 | Hoffman et al. | |
| 2,689,107 A | 9/1954 | Odegaard | |
| 2,809,802 A | 10/1957 | Suits | |
| 2,828,941 A | 4/1958 | Foley | |
| 2,920,868 A | 1/1960 | Ackerman et al. | |
| 2,984,453 A | 5/1961 | Heymann | |
| 3,027,138 A | 3/1962 | Howell et al. | |
| 3,973,874 A | 8/1976 | Corsmeier et al. | |
| 4,188,171 A | 2/1980 | Baskin | |
| 4,437,810 A | 3/1984 | Pearce | |
| 4,441,859 A | 4/1984 | Sadler | |
| 4,484,859 A | 11/1984 | Pask et al. | |
| 4,526,512 A | 7/1985 | Hook | |
| 5,165,860 A | 11/1992 | Stoner et al. | |
| 5,232,344 A | 8/1993 | El-Aini | |
| 5,356,264 A * | 10/1994 | Watson et al. ............... | 416/500 |
| 5,407,321 A | 4/1995 | Rimkunas et al. | |
| 5,820,343 A | 10/1998 | Kraft et al. | |
| 6,155,789 A | 12/2000 | Mannava et al. | |
| 6,283,707 B1 * | 9/2001 | Chin .......................... | 416/500 |

FOREIGN PATENT DOCUMENTS

JP    55046042 A  *  3/1980

* cited by examiner

*Primary Examiner*—Richard Edgar
(74) *Attorney, Agent, or Firm*—William S. Andes; Francis L. Conte

(57) ABSTRACT

A turbine blade includes an airfoil, platform, and dovetail. The airfoil includes a plurality of flow channels being separated by partitions. A primary partition includes an inner saddle. And, a bipedal damper includes a pair of legs extending into the flow channels, and integrally joined together at a seat bridging the saddle.

29 Claims, 5 Drawing Sheets

BIPEDAL DAMPER TURBINE BLADE

BACKGROUND OF THE INVENTION

The present invention relates generally to gas turbine engines, and, more specifically, to turbine rotor blades therein.

In a gas turbine engine, air is pressurized in a compressor and mixed with fuel in a combustor for generating hot combustion gases. Energy is extracted from the combustion gases by turbine rotor blades which in turn power the compressor, and an upstream fan in an exemplary turbofan aircraft engine application.

Turbine blades typically increase in radial size in the downstream direction as energy is extracted from the combustion gases. And, high pressure turbine blades are typically hollow and provided with internal cooling circuits or channels through which a portion of the pressurized compressor air is channeled for cooling the blades during operation in the environment of the hot combustion gases.

Each rotor blade includes an airfoil extending radially outwardly from an inner platform, with the platform being joined by a shank to a supporting dovetail mounted in a corresponding slot in the perimeter in a supporting rotor disk. The flow channels extend through the airfoil, platform, and dovetail and typically include a plurality of inlets in the base of the dovetail for receiving the pressurized cooling air from the compressor.

During operation, the blades drive the rotor at substantial speed and are subject to centrifugal forces or loads which pull the blades radially outwardly in their supporting slots in the perimeter of the rotor disk. The dovetail typically includes multiple lobes or tangs that carry the centrifugal loads of each blade into the rotor disk while limiting the stresses in the blade for ensuring long blade life.

Each rotor blade is also subject to pressure and thermal loads and stresses from the combustion gases which flow thereover during operation. And, the blades are also subject to vibratory stress due to the dynamic excitation thereof by the rotating blades and the pressure forces from the combustion gases.

Since the turbine airfoil is relatively thin for minimizing weight and resultant centrifugal loads, it is subject to the vibratory excitation in various modes. For example, the airfoil is subject to vibratory bending along the radial or longitudinal span thereof, as well as higher order bending modes along the axial chord direction.

Accordingly, turbine blades may also include a suitable vibration damper suitably mounted under the blade platforms. The dampers are supported by the platform and dovetail and add centrifugal loads to the rotor disk. The dampers use friction with the excited platform to provide effective damping of the blade during operation at speed.

However, these dampers have limited effectiveness for the various modes of vibration of the turbine blade during operation, including the higher order natural modes of airfoil vibration which involve complex combinations of airfoil bending in both the chord and span directions.

Accordingly, it is desired to provide an improved damper for a gas turbine engine turbine blade.

BRIEF DESCRIPTION OF THE INVENTION

A turbine blade includes an airfoil, platform, and dovetail. The airfoil includes a plurality of flow channels being separated by partitions. A primary partition includes an inner saddle. And, a bipedal damper includes a pair of legs extending into the flow channels, and integrally joined together at a seat bridging the saddle.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
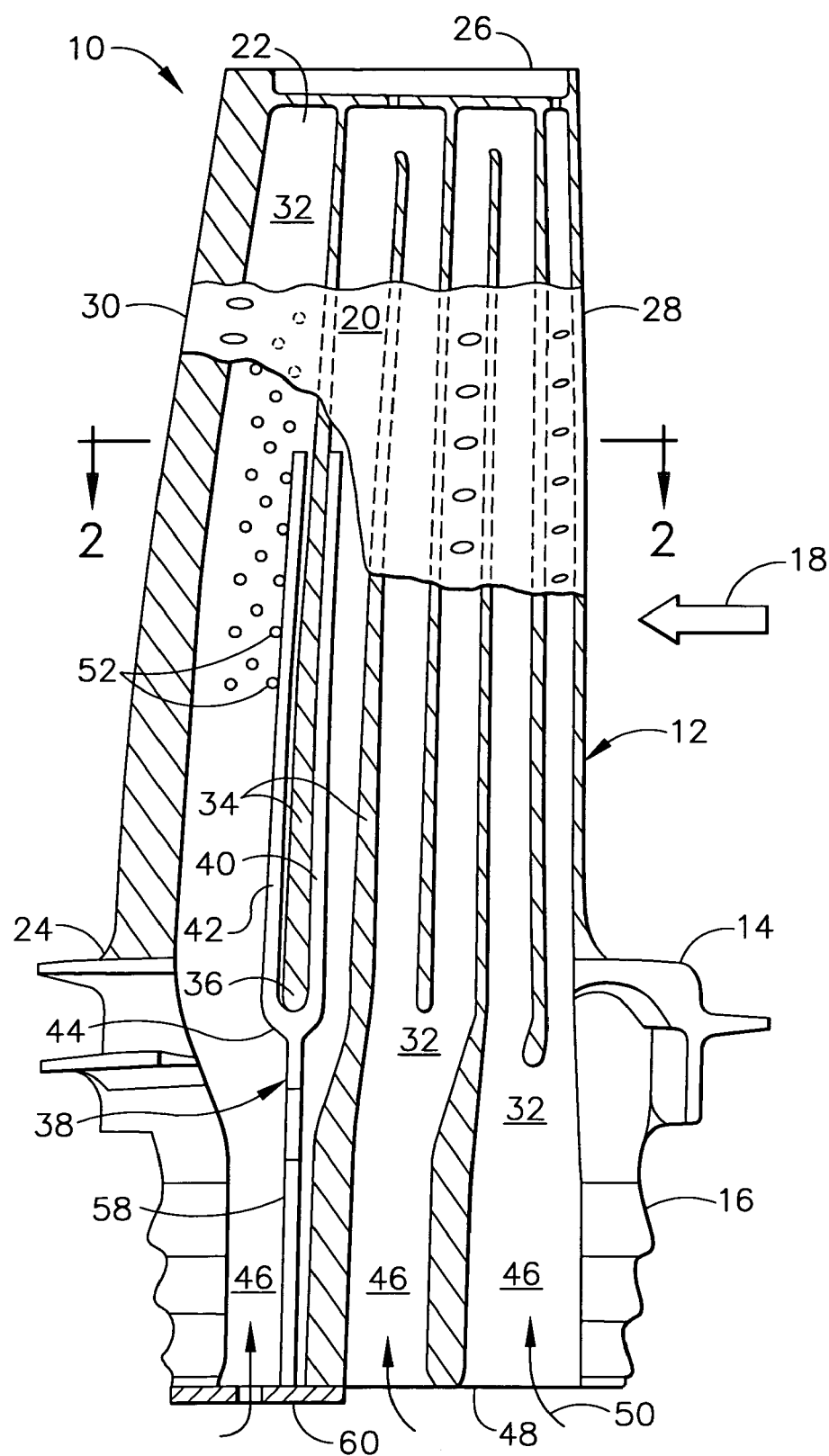
FIG. 1 is a partly sectional, elevational view of an exemplary gas turbine engine turbine rotor blade having an internal bipedal damper therein.
Figure 2:
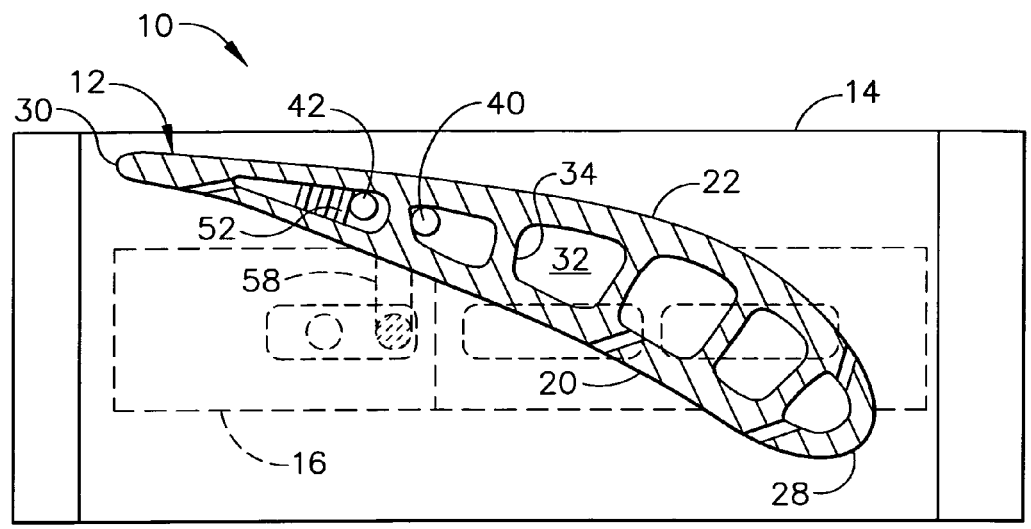
FIG. 2 is a radial sectional view of the blade illustrated in FIG. 1 and taken along line 2-2.

Illustrated in FIGS. 1 and 2 is an exemplary turbine rotor blade 10 for use in the high pressure turbine of a gas turbine engine. The blade includes a hollow airfoil 12, radially inner platform 14, and a supporting dovetail 16 formed in a unitary or integral cast assembly.

During operation, the blade is suitably supported in a turbine rotor disk (not shown) by the dovetail 16 mounted in a complementary dovetail slot in the perimeter thereof. Combustion gases 18 are generated in a combustor (not shown) and flow over the airfoil 12 which extracts energy therefrom for rotating the supporting rotor disk.

The airfoil 12 includes a generally concave pressure side 20 and a circumferentially opposite, generally convex suction side 22 extending in radial or longitudinal span between a root 24 at the platform to a radially outer tip 26. The two sides also extend in axial chord between opposite leading and trailing edges 28, 30 over the full span of the airfoil between its opposite inner and outer ends.

The airfoil includes a plurality of internal flow circuits or channels 32 extending in longitudinal span from the dovetail 16 to the outer tip 26, which flow channels may have any conventional configuration. In the exemplary embodiment illustrated in FIG. 1, five partitions 34 extend in radial span inside the airfoil to define six corresponding radial flow channels 32 therein.

Three of the partitions extend radially inwardly from the tip and terminate near the platform and alternate with two partitions extending radially outwardly from the bottom of the dovetail to just short of the airfoil tip. In this configuration, the leading and trailing edges of the airfoil have individual cooling channels specifically therefor, with the midchord region of the airfoil having two two-pass serpentine channels therein.

The pressure and suction sides of the airfoil may include various rows of conventional film cooling holes for discharging spent cooling air in protective air films over the external surface of the airfoil. And the cooling channels themselves may include turbulators, pins, or other features for enhancing the heat transfer cooling effectiveness thereof.

One of the partitions 34 illustrated in FIG. 1 has an exposed inner end which defines a radially inner saddle 36 that cooperates with an elongate internal damper 38, with this partition being referred to as a primary partition for its cooperation therewith. The partitions 34 are integrally cast with the airfoil and extend fully between the opposite pressure and suction sides along substantially the full longitudinal or radial span of the airfoil.

The internal damper 38 cooperates with at least one of the partitions for frictionally damping vibratory motion thereof during operation due to the various excitation forces experienced in the engine. The damper 38 is referred to as a bipedal or duplex damper because it includes a pair of damper legs 40, 42 extending longitudinally in span into corresponding ones of the flow channels 32 along a significant portion of the airfoil for damping vibration thereof. The first damper leg 40 is disposed generally parallel with the second damper leg 42, and these legs are integrally joined together at a common arcuate seat 44 which bridges or straddles the saddle 36.

In this way, the saddle 36 prevents outward movement of the bipedal damper inside the airfoil, and the pair of damper leg 40, 42 extend freely outwardly inside the airfoil, with unrestrained distal ends of the legs. The U-shaped damper seat 44 also ensures that the two legs of the damper are trapped in different flow channels on opposite sides of the primary partition 34.

As shown in FIG. 1, the various flow channels 32 typically include common inlets 46 for the different circuits thereof which extend through the platform 14 and dovetail 16 to begin at the inner base 48 of the dovetail below the lobes thereof. The exemplary embodiment illustrated includes three inlets 46 which feed pressurized compressor air 50 through the dovetail to the six flow channels illustrated.

The three inlets 46 are therefore relatively large compared with the several flow channels 32 fed thereby, and permit the assembly and introduction of the internal damper 38 inside the airfoil with little or no modification thereof. For example, the damper 38 is long and slender in span and sized to fit through the dovetail inlet 46 to position the two damper legs 40, 42 into their corresponding flow channels 32.

FIG. 2 illustrates that the airfoil 12 is typically twisted above the platform 14 relative to the axial orientation of the supporting dovetail 16. Accordingly, the flow channels 32 and their inner inlets 46 have a corresponding bend or curvature through the blade which may be conveniently matched by introducing a similar bend or curvature in the slender damper 38. In this way, the damper may be conveniently installed in each turbine blade by being inserted through the existing dovetail inlet 46 and pushed upwardly into final position inside the airfoil with the damper seat 44 bridging the partition saddle 36.

Figure 3:
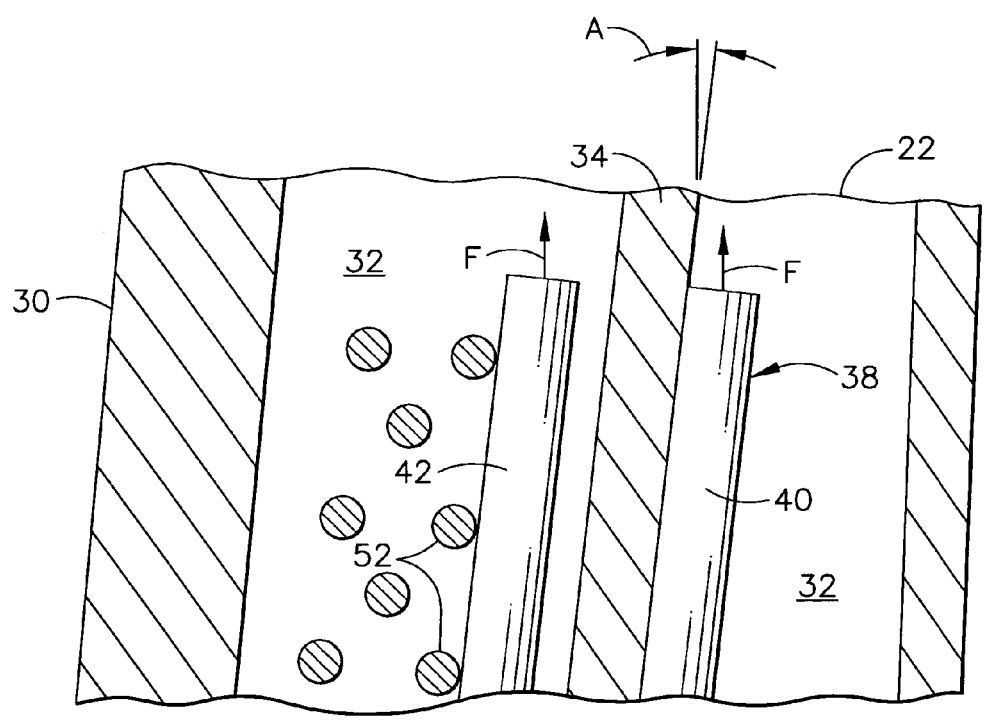
FIG. 3 is an enlarged elevational view of a portion of the turbine airfoil illustrated in FIG. 1 including the distal end of the internal damper.

FIG. 3 is an enlarged view of the distal end of the damper 38 inside the airfoil. The primary partition 34 is suitably inclined longitudinally in span inside the airfoil at a relatively small acute inclination angle A. The longitudinal inclination of the primary partition may be up to about five degrees, for example, between the root and tip of the airfoil.

The damper first leg 40 preferably conforms with the configuration and inclination of the primary partition 34 and is disposed in laterally abutting contact therewith. In this way, under rotary operation of the turbine blade, centrifugal loads or forces F are generated in the damper legs, and a component thereof urges the damper first leg 40 in frictional contact with the side of the primary partition 34 for generating frictional damping forces within the airfoil along the desired longitudinal extent or length of the damper leg. In this way, frictional damping forces are directly generated along the desired longitudinal partition of the airfoil and oppose vibratory bending of the airfoil along both the span direction thereof as well as along the chord direction.

Furthermore, the damper second leg 42 is also available for providing additional internal frictional damping inside the airfoil, as well as balancing the centrifugal forces on the first leg 40 through the common seat 44 joining the two legs together. As shown in FIGS. 1-3, the second damper leg 42 is spaced laterally from the opposite side of the primary partition 34, and is disposed in laterally abutting contact with a similarly inclined secondary partition 52.

In this embodiment, the secondary partition 52 comprises a plurality of cylindrical stiffening pins extending transversely across the flow channel 32 and integrally formed with the opposite pressure and suction sides 20, 22 of the airfoil. The pins 52 are aligned longitudinally in abutting contact with the damper second leg 42, with the second leg and aligned pins being similarly inclined at the acute inclination angle A.

In this way, centrifugal forces acting on the damper second leg 42 create a component of frictional force on the abutting pins 52 for providing additional frictional damping. And, the pins are arranged in a pattern near the thin trailing edge to increase airfoil stiffness for increasing the natural frequencies of certain higher order vibratory modes beyond the operating range of the turbine.

It is noted in FIG. 3 that the lower, or non-friction sides of the two damper legs 40, 42 are spaced from adjacent portions of the airfoil and thusly provide no friction damping on these sides. The opposite or upper sides of the two legs 40, 42 frictionally engage the primary partition 34 and the secondary partition defined by the aligned pins 52 to provide friction contact therewith which increases as the centrifugal forces on the damper legs increase during operation.

Furthermore, the exemplary damper legs 40, 42 illustrated in FIG. 2 are cylindrical and sized for being further wedged under centrifugal loads in corresponding corners defined between the respective partitions and either side of the airfoil, such as the suction side illustrated in FIG. 2. Two lines of frictional contact are therefore provided for each damper leg 40, 42, and the centrifugal loads in the individual damper legs are balanced by the bridging seat 44 at the inner ends thereof.

Figure 4:
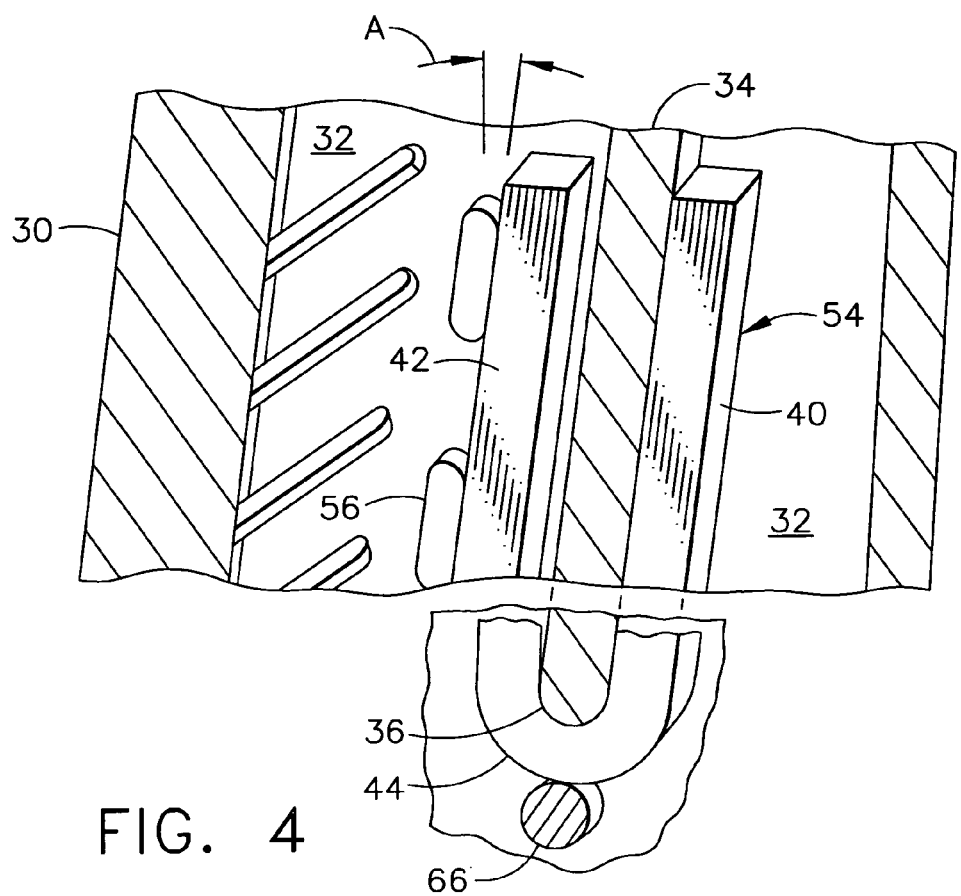
FIG. 4 is an enlarged elevation sectional view, like FIG. 3, of the internal damper in accordance with another embodiment.

FIG. 4 illustrates the bipedal damper, designated 54, in an alternate embodiment in which the first and second legs 40, 42 thereof are rectangular in section as opposed to cylindrical in the first embodiment. And, the secondary partition comprises a row of short stand-offs or elongate ribs 56 extending transversely between the airfoil sides and aligned longitudinally in abutting contact with the damper second leg 42.

The secondary ribs 56 extend the full width of the flow passage 32 between the opposite sides of the airfoil, or may extend only a portion thereof. Like the secondary pins 52 illustrated in FIG. 3, the secondary ribs 56 are also inclined at the small inclination angle A so that centrifugal force acting in the damper second leg 42 urges the second leg in frictional abutting contact with the sides of the secondary ribs 56 for generating frictional damping forces during operation.

In the embodiments illustrated in FIGS. 1-4, the damper seat 44 and partition saddle 36 are disposed in radial elevation adjacent to the platform 14. And, the damper legs 40, 42 extend outwardly in span therefrom through the airfoil 12 to a suitable elevation therein which is typically greater than about the mid-span of the airfoil. In this way, both damper legs 40, 42 may be located primarily only inside the airfoil itself and extend in span therein for maximizing the frictional damping effectiveness thereof.

Since the damper itself adds weight to the entire turbine blade, that weight under centrifugal force must be additionally carried by the common blade dovetail 16 into the supporting rotor disk. The damper itself should therefore be made as slender and lightweight as possible, with the length thereof being limited by the effectiveness of resulting frictional damping therefrom. In the preferred embodiment, the two legs 40, 42 have generally equal length and extension inside the airfoil, for doubling damping effectiveness while balancing the centrifugal loads therein.

The embodiment of the damper 38 illustrated in FIG. 1 further includes a common or single stem 58 which extends downwardly or inwardly from the seat 44 to the dovetail base 48. The stem 58, like the damper legs 40, 42, is elongate and slender and may be integrally formed with the legs in a unitary assembly of a suitable superalloy metal, such as that used in fabricating the turbine blade itself.

The damper legs may therefore be slender and configured for matching the corresponding orientation of the airfoil. Whereas, the stem 58 may also be slender but configured for matching the corresponding configuration of the inlet 46 including the bends therein for transitioning the axial dovetail with the twisted airfoil thereabove. The flexibility of the slender damper may therefore be used for elastically deforming the damper as required during the insertion thereof through the dovetail inlet in the assembly process.

In the assembled configuration illustrated in FIG. 1, the primary and secondary partitions 34, 52 are laterally spaced apart from each other, and both partitions have at least portions thereof which are inclined longitudinally inside the airfoil 12 at the desired small inclination angle A illustrated in more detail in FIG. 3. The damper first leg 40 conforms with the primary partition 34 over most if not all of its length, and is disposed in abutting contact with the primary partition. The damper second leg 42 conforms over most of its length as desired with the secondary partition defined by the aligned row of pins 52, and is disposed in abutting contact therewith.

The common stem 58 therefore provides a convenient manner for assembling the two damper legs inside the airfoil, as well as increasing the structural integrity of the unitary damper.

An additional advantage of the stem 58 may be obtained by fixedly joining the distal end of the stem 58 to a flat metering plate 60. The plate 60 is preferably larger than the corresponding inlet 46 and is itself affixed to the base 48 of the dovetail 16 to close the inlet 46. The metering plate has an aperture therein of precise area for metering the inlet flow into the flow channels in which the damper is mounted.

Furthermore, the stem 58 as shown in FIG. 1 may be affixed to the dovetail 16 by the metering plate 60 to longitudinally support the damper seat 44 below the saddle 36 and bypass some or all of the centrifugal loading from the saddle 36 to the dovetail 14. For example, the length of the stem 58 may be slightly shortened so that a radial clearance or gap is provided between the damper seat 44 and the saddle 36.

In this way, the radial centrifugal loads generated by the entire damper during operation may be carried radially inwardly through the metering plate 60 and into the dovetail. Alternatively, the radial gap between the saddle and seat may be eliminated or adjusted for sharing centrifugal loads through the saddle 36 and the metering plate 60.

Figure 5:
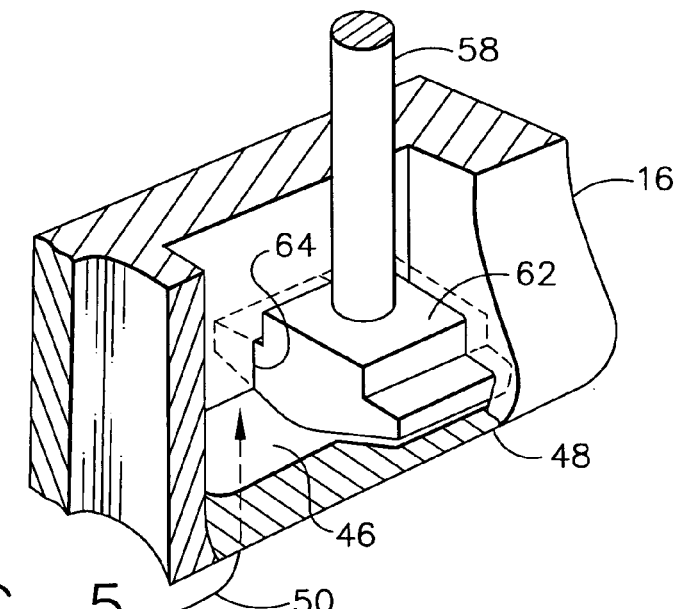
FIG. 5 is a sectional view of a portion of the dovetail illustrated in FIG. 1 including a retainer for the internal damper in accordance with another embodiment.

FIG. 5 illustrates an alternate embodiment in which the metering plate is replaced by a solid stepped block 62 in the form of a mini-dovetail. The block 62 is affixed to the distal end of the stem 58 and is mounted in a complementary notched seat 64 inside the common inlet 46 at the dovetail base 48. The block 62 may be about half the width of the common inlet 46 for providing an aperture to meter the flow of cooling air into the flow channels.

The configuration of the block 62 preferably matches the lobed dovetail 16 for being recessed therein from its base end. And, like the metering plate 60 disclosed above, the retaining block 62 may be fixedly joined to the stem 58 and dovetail 16 by conventional brazing for effectively carrying centrifugal loads from the damper directly into the supporting dovetail 16.

The embodiment of the damper 54 illustrated in FIG. 4 is stemless, and initiates at one end at the common seat 44 thereof and terminates at the opposite distal ends of the two legs 40, 42. In this way, the flow channels 32 including the common inlet 46 having the metering plate 60 are unobstructed by the damper 54 itself between its seat 44 and the common inlet 46.

However, without the stem in the damper, the load path for the centrifugal loads of the damper must be carried by the primary partition 34 instead of directly through the dovetail through the metering plate 60 or the retainer block 62 as disclosed above. In this embodiment, the saddle 36 is arcuate or semicircular, and the damper seat 44 is correspondingly arcuate or semicircular to provide a complementary joint through which the centrifugal loads may be carried from the damper and into the primary partition with minimal stress concentration thereat. And, the duplex leg design of the damper may be used to balance centrifugal loads from the two legs for effecting compression loads along the radial span of the primary partition 34, and therefore minimize undesirable stresses therein.

In the exemplary embodiment illustrated in FIG. 4, the damper seat 44 longitudinally abuts the partition saddle 36 for transferring centrifugal loads thereto. And, the blade further includes a suitable retainer 66 abutting the damper seat 44 on its opposite lower side for longitudinally trapping the damper 54 against the primary partition 34. The parallel-leg configuration of the damper 54 also traps the damper laterally on the primary partition 34 in the direction of the airfoil chord.

The retainer illustrated in FIG. 4 is preferably in the form of a cylindrical pin 66 extending transversely through a complementary cylindrical hole in the shank of the blade between the platform 14 and the dovetail 16. The position of the saddle 36 and seat 44 in FIG. 4 matches the corresponding position in FIG. 1, and permits the introduction of the retainer pin 66 through the plain shank portion of the blade between the platform and dovetail.

During assembly, the duplex damper 54 may be inserted into position into the flow channels and trapped on the saddle 36. The pin 66 may then be inserted through the shank to further trap the damper. And the pin may then be brazed in place to complete the assembly process.

Figure 6:
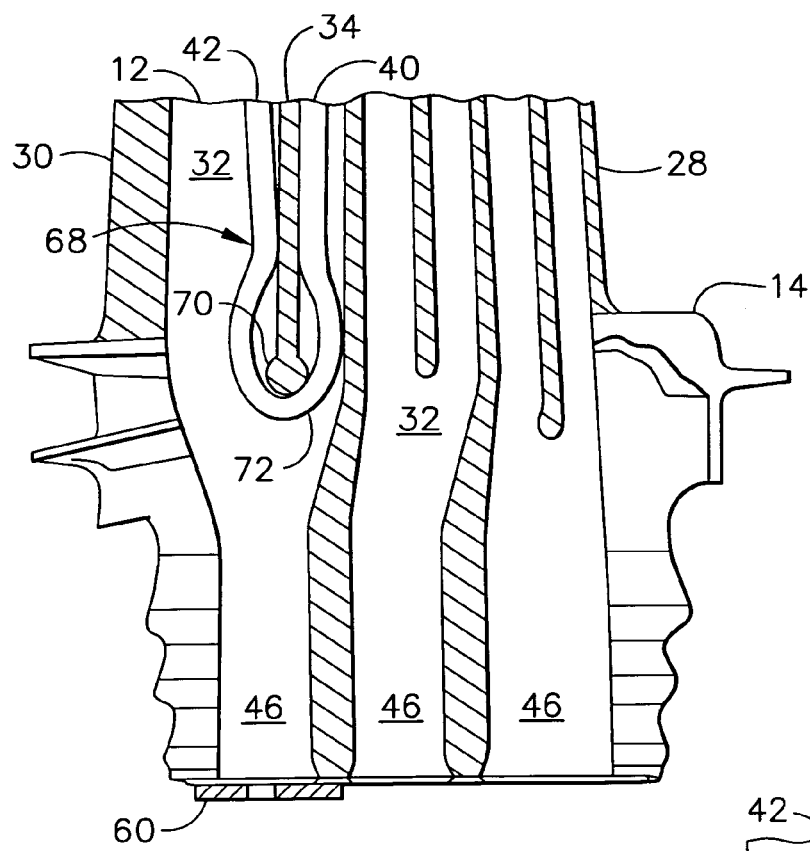
FIG. 6 is an elevational sectional view of the lower portion of the turbine blade illustrated in FIG. 1 in accordance with another embodiment.

FIG. 6 illustrates yet another embodiment of the damper, designated 68, which is generally similar to the embodiment of the damper 54 illustrated in FIG. 4 and includes the two legs 40, 42 in a stemless configuration. In this embodiment, the saddle, designated 70, is bulbous or circular, and is wider than the portion of the primary partition 34 adjacent thereto.

Correspondingly, the two damper legs 40, 42 are bowed around the bulbous seat, designated 72. And the legs have a narrower spacing than the bulbous saddle 70 to longitudinally or radially self-retain the damper 68 on the primary partition.

In this configuration, the slender damper legs provide sufficient resiliency for spreading the legs during assembly to clear the enlarged saddle 70. After assembly, the two legs resume their narrow spacing and prevent removal of the damper from the saddle 70 unless sufficient withdrawal force is provided to again resiliently spread the damper legs.

The enlarged saddle 70 and seat 72 increase the surface area over which centrifugal loads are transferred from the damper to the partition for correspondingly reducing stress therein. And, the bulbous seat 72 further reduces the concentration of centrifugal loads and stress at the juncture between the two damper legs and the supporting saddle 70.

In the embodiment illustrated in FIG. 6, the damper legs 40, 42 are bowed larger in width than the bulbous saddle 70 to provide lateral voids or spacings therebetween. In this way, relatively little material or weight is added to the distal end of the primary partition 34 for supporting the damper 68, and the bulbous damper seat 72 reduces stress concentrations in the damper when under centrifugal loading.

Figure 7:
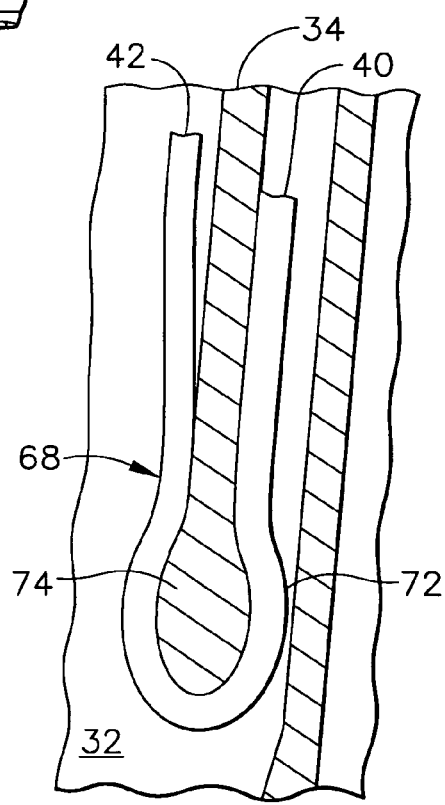
FIG. 7 is an enlarged elevational sectional view of the internal damper illustrated in FIG. 6 in accordance with another embodiment.

FIG. 7 illustrates a further modification of the embodiment illustrated in FIG. 6 in which the damper legs 40, 42 are bowed to complement or conform with the enlarged bulbous saddle, designated 74, with the saddle 74 being as large as the damper seat 72. In this way, little if any gaps or voids are provided between the saddle 74 and the seat 72 for increasing the surface area between the damper and the partition through which centrifugal loads are carried during operation.

However, the enlarged saddle 74 increases the weight of the blade which must be carried through the supporting dovetail. A tradeoff in design may therefore be conducted for minimizing blade weight while also minimizing the additional loading and stress provided by the introduction of the internal damper which itself must be supported by the common blade dovetail during operation.

Figure 8:
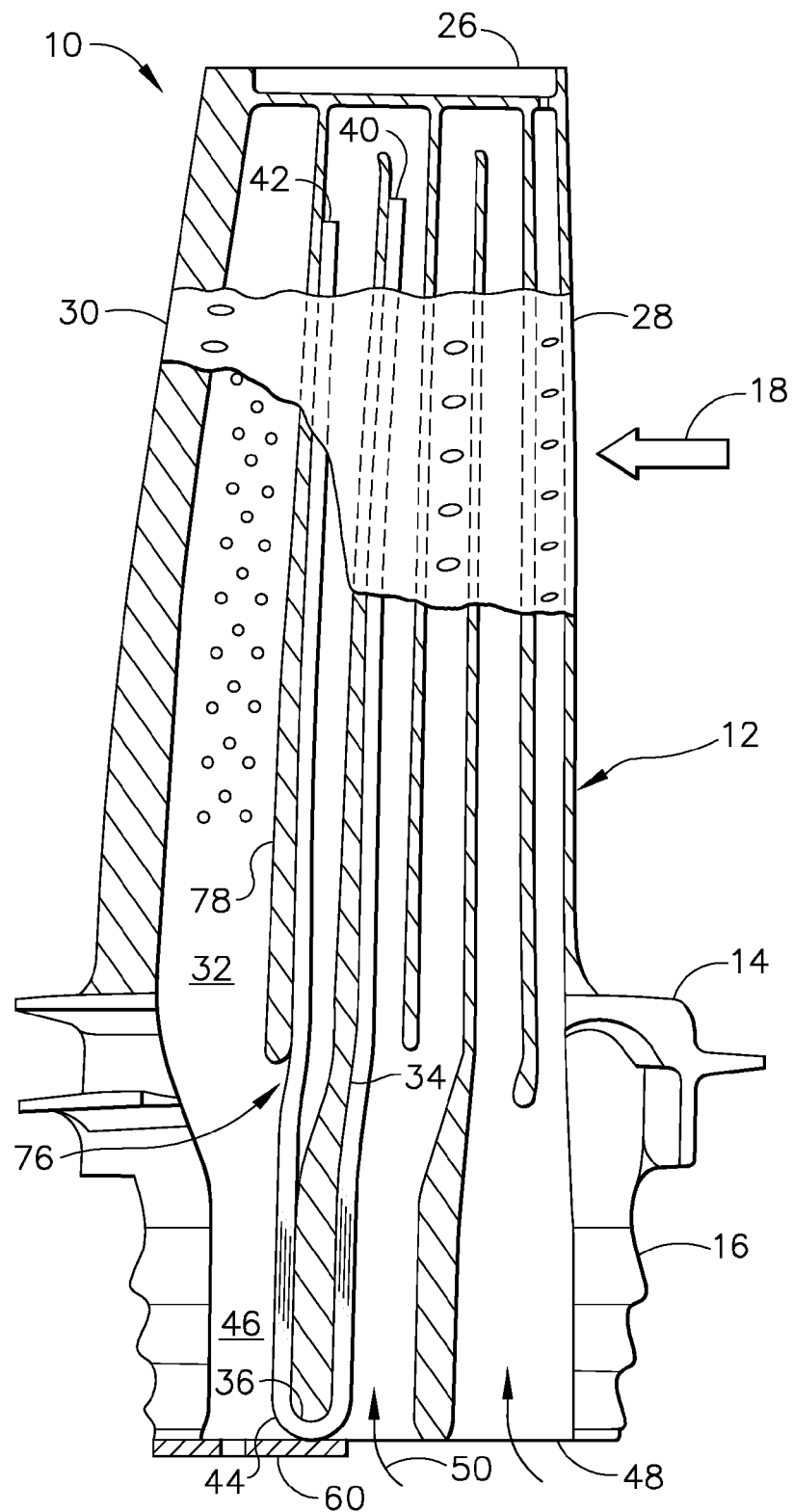
FIG. 8 is an elevational sectional view of the turbine blade illustrated in FIG. 1 in accordance with another embodiment.

FIG. 8 illustrates yet another embodiment of the damper, designated 76, which similarly includes the two damper legs 40, 42 extending in span from the common seat 44. However, in this embodiment the damper seat 44 is disposed at the dovetail base 48 instead of higher in the blade at the platform 14 as illustrated in FIG. 1. The two legs 40, 42 of the damper are therefore longer in span to extend through the dovetail, platform, and inside the airfoil over most of its length as desired for damping vibration thereof.

In the embodiment illustrated in FIG. 8, the primary partition 34 extends continuously from the dovetail base 48 through the platform and inside the airfoil to just short of the airfoil tip. Correspondingly, the secondary partition in this embodiment is designated 78 and is one of the several partitions which define the flow passages 32. The secondary partition 78 extends inwardly from the airfoil tip and terminates near the platform 14 and is spaced laterally from the primary partition 34 to define two corresponding flow channels 32 in which the two legs 40, 42 extend.

Both partitions 34, 78 are solid and continuous over their longitudinal extent in the blade, and both include some or most portions thereof inclined at the shallow inclination angle A as disclosed above for cooperating with the correspondingly inclined damper legs 40, 42 which conform with the two partitions for frictional damping thereof when loaded under centrifugal force.

In this embodiment, the primary partition 34 preferably stops short of the dovetail base 48 to provide a recess therein at which the saddle 36 is located. The damper seat 44 may then be conveniently disposed in the recess fully hidden within the dovetail, with the metering plate 60 being used as the retainer for trapping the damper inside the blade. The slender damper 76 may be conveniently inserted through the inlet end of the dovetail 16 during assembly, with the metering plate 60 being brazed to the dovetail at the corresponding inlet 46 for trapping the damper within the blade.

The various forms of bipedal dampers disclosed above may be formed of relatively simple wire having cylindrical or rectangular cross sections, for example, and are therefore relatively slender, flexible, and lightweight. The two legs of the dampers balance centrifugal loads created therein during operation and provide two legs for simultaneous damping of the airfoil.

The basic shape of the duplex damper is an elongate U, with generally parallel legs which may be conveniently inserted into corresponding flow channels within the airfoil.

The damper utilizes existing or conventional structural features of the blade with little if any modifications necessary to incorporate the damper. The damper may therefore be readily retrofit into existing blade designs.

The damper has many configurations from short to long and with and without stems for the various advantages disclosed above. Various mechanisms have also been disclosed for retaining the dampers both in the chord direction of the airfoil as well as in the longitudinal direction of the airfoil along its span. And, centrifugal load sharing may be provided in the damper between the airfoil and the dovetail in accordance with the different retention designs disclosed above.

In the preferred embodiment, the damper itself should be as simple and lightweight as possible for minimizing the weight thereof and added centrifugal loads during operation, while still providing enhanced internal damping of the blade airfoil including, in particular, higher order natural modes of vibration thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   an airfoil integrally formed at a root with a platform and mounting dovetail;
   said airfoil having a plurality of flow channels extending in span from said dovetail to an outer tip thereof, and adjacent channels being separated by a corresponding primary partition having an inner saddle; and
   a bipedal damper having a pair of legs extending in span into corresponding ones of said channels and integrally joined together at a seat bridging said saddle.

2. A blade according to claim 1 wherein:
   said airfoil includes opposite pressure and suction sides extending in span between said root and tip, and extending in chord between opposite leading and trailing edges;
   said primary partition extends in span inside said airfoil and is integrally joined with said pressure and suction sides;
   said flow channels include a common inlet extending through said platform and dovetail to the inner base thereof; and said damper is slender in span and sized to fit through said dovetail inlet to position said legs into said channels.

3. A blade according to claim 2 wherein:
said primary partition is inclined longitudinally inside said airfoil; and
said damper includes a first leg conforming with said primary partition and disposed in laterally abutting contact therewith, and a second leg laterally spaced from an opposite side of said primary partition and disposed in laterally abutting contact with a secondary partition.

4. A blade according to claim 3 wherein said secondary partition comprises a plurality of pins extending transversely between said airfoil sides and aligned longitudinally in abutting contact with said damper second leg.

5. A blade according to claim 3 wherein said secondary partition comprises a row of ribs extending transversely between said airfoil sides and aligned longitudinally in abutting contact with said damper second leg.

6. A blade according to claim 3 wherein said secondary partition extends longitudinally through said airfoil and is spaced from said primary partition to define corresponding ones of said flow channels.

7. A blade according to claim 3 wherein said damper seat is disposed adjacent said platform, and said damper legs extend outwardly therefrom through said airfoil greater than about the mid-span thereof.

8. A blade according to claim 3 wherein said damper seat is disposed at said dovetail base, and said damper legs extend outwardly therefrom through said dovetail, platform, and airfoil.

9. A blade according to claim 3 wherein said damper further includes a common stem extending inwardly from said seat to said dovetail base.

10. A blade according to claim 9 wherein said damper further includes a metering plate affixed to said stem and to said dovetail at said inlet.

11. A blade according to claim 9 wherein said damper further includes a stepped block affixed to said stem and to a complementary notched seat inside said inlet at said dovetail base.

12. A blade according to claim 9 wherein said stem is affixed to said dovetail to support said damper seat below said saddle and bypass centrifugal loading of said damper from said saddle to said dovetail.

13. A blade according to claim 3 wherein said damper initiates at one end at said seat thereof and terminates at an opposite end of said legs.

14. A blade according to claim 13 wherein:
said damper seat longitudinally abuts said partition saddle for transferring centrifugal loads thereto; and
further comprising a retainer abutting said damper seat on an opposite side thereof for trapping said damper against said primary partition.

15. A blade according to claim 14 wherein said retainer comprises a pin extending transversely through the shank of said blade between said platform and dovetail.

16. A blade according to claim 14 wherein said retainer comprises a metering plate affixed to said dovetail at said inlet.

17. A blade according to claim 13 wherein:
said saddle is bulbous and wider than said primary partition adjacent thereto; and
said damper legs are bowed around said seat, and have a narrower spacing than said bulbous saddle to longitudinally retain said damper on said primary partition.

18. A blade according to claim 17 wherein said damper legs are bowed larger in width than said bulbous saddle to provide lateral voids therebetween.

19. A blade according to claim 17 wherein said damper legs are bowed to conform with said bulbous saddle.

20. A turbine blade comprising:
a hollow airfoil including opposite pressure and suction sides extending in span between a root and tip, and extending in chord between opposite leading and trailing edges;
a platform and an integral dovetail affixed to said airfoil root;
said airfoil further including a plurality of flow channels separated by corresponding partitions and extending in span between said root and tip;
said partitions including a primary partition having an inner saddle at an inner end thereof;
said flow channels including a common inlet extending through said dovetail and platform to said airfoil; and
a bipedal damper having first and second legs extending in span into corresponding ones of said flow channels inside said airfoil, and integrally joined together at an arcuate seat bridging said saddle.

21. A blade according to claim 1 wherein:
said partitions include a secondary partition spaced laterally from said primary partition, and both said primary and secondary partitions are inclined longitudinally inside said airfoil;
said damper first leg conforms with said primary partition and is disposed in abutting contact therewith; and
said damper second leg conforms with said secondary partition and is disposed in abutting contact therewith.

22. A blade according to claim 21 wherein said damper further includes a common stem extending inwardly from said seat to a base of said dovetail.

23. A blade according to claim 22 wherein said damper further includes a metering plate affixed to said stem and to said dovetail at said inlet.

24. A blade according to claim 22 wherein said damper further includes a stepped block affixed to said stem and to a complementary notched seat inside said inlet at said dovetail base.

25. A blade according to claim 22 wherein said stem is affixed to said dovetail to support said damper seat below said saddle and bypass centrifugal loading of said damper from said saddle to said dovetail.

26. A blade according to claim 21 wherein said damper seat is disposed adjacent said platform, and said damper legs extend outwardly therefrom through said airfoil greater than about the mid-span thereof.

27. A blade according to claim 26 wherein:
said damper seat longitudinally abuts said partition saddle for transferring centrifugal loads thereto; and
further comprising a retainer abutting said damper seat on an opposite side thereof for trapping said damper against said primary partition.

28. A blade according to claim 27 wherein said damper initiates at one end at said seat thereof and terminates at an opposite end of said legs; and said flow channels are unobstructed by said damper between said seat and said common inlet.

29. A blade according to claim 27 wherein said damper legs are bowed around said seat for locally increasing the width of said damper thereat.

* * * * *

UNITED STATES PATENT AND TRADEMARK OFFICE
CERTIFICATE OF CORRECTION

| | | |
|---|---|---|
| PATENT NO. | : 7,413,405 B2 | Page 1 of 1 |
| APPLICATION NO. | : 11/151769 | |
| DATED | : August 19, 2008 | |
| INVENTOR(S) | : Bruce C. Busbey et al. | |

It is certified that error appears in the above-identified patent and that said Letters Patent is hereby corrected as shown below:

Column 10, line 24 (Claim 21, line 1) delete "claim 1" and substitute therefor -- claim 20 --.

Signed and Sealed this

Eighteenth Day of November, 2008

JON W. DUDAS
*Director of the United States Patent and Trademark Office*